United States Patent Office 3,154,530
Patented Oct. 27, 1964

3,154,530
PREPARATION OF POLYETHYLENE POWDERS
Theodore E. Mullen, South Charleston, W. Va., assignor to Union Carbide Corporation, a corporation of New York
No Drawing. Filed Feb. 29, 1960, Ser. No. 11,472
8 Claims. (Cl. 260—94.9)

This invention relates to a method for preparing polyethylene powders and more particularly to a method for preparing polyethylene powders useful in fluidized bed coating.

The desirability of a plastic coating on a wide variety of articles has come to be well recognized. Plastic coatings are now employed on planar substrates such as sheet material web; and on irregularly shaped, non-planar, fenestrated or wire-formed structures. It is to these latter that fluidized bed coating is especially well adapted. Polyethylene, particularly, provides highly advantageous coatings characterized by good mechanical strength and excellent resistance to chemically active environments. Polyethylene, however, is not readily applied to non-planar structures. For example, a commonly used method for applying plastic coatings to such structures utilizes a solution of the resin in a solvent. Solution coating methods are not useful with polyethylene because the resin does not dissolve in solvents at ordinary temperatures. Further, suitable solvents for solution coating methods are expensive and flammable, hence hazardous. The use of solvents at elevated temperatures while enabling the preparation of polyethylene solutions brings increased health and explosion hazards. In addition, the necessity of maintaining the coating bath at an elevated temperature makes hot solution coating methods impracticable.

An alternative method to solution coating known as "fluidized bed coating" has been developed. In coating by this method, powdered thermoplastic resin is placed in a suitable size container which is equipped with a porous bottom. Air or other gas is blown through the porous bottom up into the resin powder bed. The air or gas is introduced with sufficient force to lift the powder up and separate the individual particles, but not enough to carry the powder out of the container. The result is a suspending of the powdered particles between the bottom of the container and the lip at the top thereof. With properly sized powdered particles the bed of resin moves agitatedly and randomly and, in this motion, resembles a fluid. Hence, the term "fluidized bed." Fluidized powder generally occupies a 10–100% greater volume than the same amount of powder which has not been fluidized. The article to be coated is heated to a temperature above the fusion point of the resin forming the fluidized bed and then, while thus heated, is immersed in the bed. Air-suspended particles of resin impinging on the surface of the heated article fuse and cling thereto. Ideally, the random but uniform distribution of suspended particles in the fluidized bed insures virtually simultaneous contact of resin particles with all surfaces of the immersed article and as a result, a complete coating of even thickness everywhere on the article is achieved. Coating thickness is easily controlled by varying the time of immersion. Ordinarily, immersion for a period of from 1–5 seconds produces a coating of 3–10 mils thickness. After immersion, the resin particles fused on the article give the appearance of being frost. A smooth, tough, adherent coating is obtained by after-baking the "frosted" article for a short time.

The quality of coatings obtained by fluidized bed coating methods is in large measure dependent upon the particles comprising the powder bed. Particles which are fibrous or thread-like, or otherwise non-rounded or non-uniformly shaped do not give as good results as rounded, fairly regularly shaped particles. In addition to the shape, the size of the particles making up the bed is highly important. It has been found that powdered resins having an average particle size of over 500 microns diameter provide coatings which are rough and lumpy. Even powdered resins having only 5–10% of their constituent particles over 500 microns in average diameter give rough-surfaced coatings because the larger particles melt so slowly comparatively that they do not have sufficient time to flow out into a uniformly thick coating. Hence, powdered resins to be suitable for use in fluid bed coatings from a finished coating standpoint must have over 95 to 100% of their particles less than 500 microns in average diameter. Reduction in average particle size of the powdered resin particles to far below 500 microns, however, decreases the ability of the powdered resin to form a fluidized bed. In particular, reduction of the average particle size to about 50 microns or less gives powder beds which tend to channel gases there-through rather then form fluidized beds of dancing, ebullient particles. It is clear, therefore, that for powdered resins used in fluidized bed coating the average particle size is narrowly critical and must be between 500 and 50 microns. As used herein "average particle size" is synonomous with "average diameter" of the particle and is a figure indicating the diameter of a hypothetical particle of such a size that half of the sampled material is smaller in particle size and half larger in particle size. Average diameter is determined from a graph of a sieve analysis plotting screen opening in microns versus cumulative weight percent of material passed through.

Such a powdered polyethylene resin is not economically available at the present time. Heretofore known powdered polyethylene resins have been either irregular in shape, hence erratic in fluidization, or too large and hence unable to provide smooth coatings or too small to be successfully suspended by gas flow. Efforts to grind larger polyethylene pellets into usable particle sizes have been unsuccessful or prohibitively expensive. Grinding of horny polyethylene in standard apparatus such as a hammer mill requires a high energy input, and causes softening and heating of the resin pellets and eventual clogging and jamming of the grinding apparatus. The difficulty experienced in grinding horny polyethylene to reduce the average particle size of the resin is attributable to the need to break carbon-to-carbon bonds and/or disentangle intertwisted molecular chains.

It is an object, therefore, of the present invention to provide a method for preparing polyethylene powders suitable in all respects for use in fluidized bed coating.

It is another object to provide a method for preparing polyethylene powders having an average particle size of less than 500 microns, wherein the particles are rounded and uniformly shaped and sized.

In accordance with the present invention, it has now been discovered that these and other objects are achieved by dissolving polyethylene in a liquid organic solvent to form a dilute solution, precipitating the polyethylene from said solution as ultimate particles, separating said liquid organic solvent and said ultimate particles, thereby aggregating said ultimate particles into friable granules having an average particle size of up to about 7000 microns; and thereafter grinding said friable granules until at least 9% thereof have a particle size of less than 500 microns.

The steps prior to grinding enumerated above produce a friable granule which comprises aggregated ultimate particles. Dry grinding of these materials fractures the granules along the lines of the interfaces between aggregated particles. Thus, only relatively weak interfacial forces must be overcome by grinding in the method of this invention, whereas carbon-to-carbon bonds had to be broken and intertwisted molecular chains disentwined in methods heretofore known which attempted to grind pellets of horny polyethylene.

In general, any normally solid, resinous ethylene polymer, whether of low, medium or high density, as well as ethylene copolymers containing above about 90% copolymerized ethylene which have a melt index above about 0.005, can be prepared in a form suitable for fluidized bed coating with the method described herein. Limitations inherent in the fluidized bed coating method, however, require certain melting characteristics in the polymer, with the result that the method is most desirably employed with polyethylenes having a melt index between about 0.005 and 100 and preferably 0.0 and about 4. There are no limits on density of the normally solid polyethylene, but because of the great toughness of linear or higher density polyethylenes, i.e., having densities above about 0.95, and consequent difficulty in the processing thereof by conventional grinding methods, the method herein described is particularly adaptable to such polyethylenes and especially advantageous therewith.

The polyethylene can contain conventional additives in the usual amounts. Antioxidants, various stabilizers, dyes, fillers, pigments, resin solutions such as polyisobutylene and like modifiers can be added to the polyethylene to achieve good processing or special end effects, e.g., color. The addition of these modifiers or additives to the polyethylene can be made prior to preparation of a powder therefrom in accordance with the method herein set forth.

To produce the polyethylene powder of this invention, a solution of the desired polyethylene in an inert liquid organic solvent is first prepared. The particular solvent used is not critical. Among suitable solvents are heptane, cyclohexane, hexane, octane, nonane and various isomers thereof as well as toluene, xylene, trimethyl benzene, petroleum ether, carbon tetra-chloride, ethylene dichloride, trichloro-ethylene and the like and mixtures of the foregoing. Heptane is the preferred solvent because of ready availability in high purity, low cost, convenient boiling temperature and ease of steam distilling. The concentration of polyethylene in the solvent is limited by viscosity considerations. To maintain a usable viscosity, suitably in the range of 10 to 10,000 centistokes, a concentration of 1–5% by weight of polyethylene in the solvent is generally employed but somewhat higher concentrations can be used if desired. Normally, less than a 1% by weight polyethylene concentration is not economically feasible, but has no effect on the product obtained. To achieve dissolution, the polyethylene is slurried in an inert liquid organic solvent, which slurry is heated to a temperature above the solution temperature of polyethylene in that solvent but below the boiling point of the solvent unless pressure is applied to the system. Conveniently, the solution formation is carried out in a closed container with sufficient pressure being used to prevent the boiling away of the solvent. With a heptane-polyethylene slurry, heating is desirably continued until a temperature of 130–185° C. is reached, at which point the polyethylene goes into solution. The solution is thereafter maintained at the elevated temperature to prevent precipitation of the polyethylene prior to the next step of the method. It is not always necessary to start with solid polyethylene and dissolve in the solvent. For example, useful polyethylene solutions are conveniently obtained from ethylene polymerization lines. Solutions thus obtained can be used directly in the method of this invention.

The addition and dispersion of various modifiers are conveniently accomplished in the polyethylene solution. The modifiers are added to the solution and upon precipitation of the dissolved polyethylene, as described below, are homogeneously dispersed therein. This expedient eliminates costly compounding on two-roll mills and also provides dispersions superior in degree of homogeneity to those obtained by blending powdered resin with a powdered modifier.

In a critical step of the method the polyethylene solution is cooled so that the solution temperature of polyethylene in the solvent used is no longer maintained. This cooling must be accomplished in the absence of turbulence; the heat may be removed by gradual transfer to an external coolant or by direct contact with an immiscible liquid, such as water or other liquid nonsolvent for polyethylene. As a result, the dissolved polyethylene precipitates.

In a preferred means of precipitating the polyethylene, an oil-water emulsion is formed by adding 1 to 5 volumes of hot water, which is at or near the same temperature as the solution, to the solution or vice versa and agitating the mixture sufficiently to form an emulsion comprising discrete droplets surrounded by water which are globules of solution dispersed and, hence, forming an inner phase, in water which forms the outer phase of the dispersion. Mixing with water and agitation cools the solution so that the solution temperature of polyethylene in the solvent used is no longer maintained. As a result, the dissolved polyethylene precipitates. It is the precipitation of polyethylene, achieved as above described, which enables the obtaining of the polyethylene powders of this invention.

When brought out of solution as above set forth, the precipitate of polyethylene is in the form of "ultimate particles," which are defined for the purposes of this specification and appended claims as polyethylene resin particles having an average diameter of less than 5 microns and preferably from 0.1 to 1 micron. The obtaining of ultimate particles is absolutely necessary in the present invention.

After formation of the ultimate particles, the inert liquid hydrocarbon solvent is separated therefrom by mechanical means, such as filtration, steam stripping and the like. Steam stripping is carried out by purging steam through the dispersion, thus removing all of the solvent; extra water is added to maintain about 5% total solids.

Removal of the solvent results in aggregating the ultimate particles above described by interfacial and surface tension forces. It is essential in this invention to form aggregates during separation of the solvent. The aggregates of the ultimate particles are herein termed "granules." The average diameter of the granules obtained with the method of this invention varies from about 400 to 7000 microns and is preferably around 3000 microns. After substantially all of the solvent has been removed, the granules and any water present form a slurry. This slurry is dehydrated by any conventional means, e.g., rotary dryer, circulating air oven, etc., at a temperature below the fusing temperature of the resin, e.g., 60–120° C. The dry granules are friable, that is, by the application of comparatively little shearing force, they crumble and disintegrate into lesser particles, forming an ideal fluidized bed powder.

The importance of obtaining ultimate particles and subsequently aggregating them is clearly shown by the friable nature of the granules resulting from such aggregation. As pointed out above, the granules split and crumble along the interfaces of the cohering ultimate particles. No carbon-to-carbon bonds are broken. No intertwisted molecular chains are separated. The granules fracture along lines of least resistance and do so readily Further, the shape and size of the resultant particles are perfect for fluidized bed coating. The particles are rounded, uniformly shaped and consistently form easily fluidized powders. The size of the particles is readily brought within the 50–500 micron range found to be critical for fluid bed coating by grinding the granules in a mortar and pestle, ball mill, hammer mill, Micronizer (fluid energy mill) or the like. Good coating results are obtained with polyethylene powders wherein a minimum of 95% of the particles pass through a 500 micron opening (35 mesh U.S. Standard screen). Oversize particles are removable by air classification or screening and can be discarded or reground.

In order to more fully set forth the nature and practice of this invention, the following examples are presented. All parts and percentages are by weight, unless otherwise indicated.

*Example 1*

A 2% slurry of 1.6 melt index 0.95 density polyethylene in heptane was prepared. The slurry was heated under pressure to 140° C. to melt the polyethylene and dissolve it in the heptane. About 2.5 volumes of water at about 40° C. was mixed therewith, and the mixture cooled to 65° C at which temperature the dissolved polyethylene precipitated from solution in the form of ultimate particles, less than 5 microns in average diameter. The ultimate particles were suspended in the heptane; this slurry was dispersed by agitation into globules in the added water. Steam was sparged through the heptane globule/water dispersion, and the heptane was removed as a constant boiling mixture with water at about 80° C., the pressure being on the order of 500 mm. The removal of the heptane caused the aggregation of the ultimate particles previously suspended in the heptane to granules of from 400 to 7000 microns in diameter. The granules, with the remaining water, formed a slurry which contained about 3% polyethylene. The slurry was filtered and dried in a rotary drum drier. After drying, the granules were ground in a hammer mill using a 1500 micron opening screen. Sieve analysis of the resin powder was:

| | Percent |
|---|---|
| Retained on 35 mesh (500 micron opening) | 5.5 |
| Retained on 45 mesh (350 micron opening) | 14.2 |
| Retained on 60 mesh (250 micron opening) | 21.5 |
| Retained on 80 mesh (175 micron opening) | 18.2 |
| Retained on 120 mesh (125 micron opening) | 11.0 |
| Retained on 170 mesh (88 micron opening) | 11.0 |
| Passing through 170 mesh | 11.0 |
| | [1] 99.7 |

[1] 0.3% losses.

The resin powder remaining on the 35 and 45 mesh screens was too coarse for optimum fluidized bed coating; hence, only the resin passing through the 45 mesh screen was used in the following tests. One-inch wide five-inches long, ⅛ inch thick steel panels were heated to 200° C. and dipped into a fluidized bed for 2 to 5 seconds. A powdery coating adhered to the panels. The so-coated panels were baked for five minutes to 200° C. The process was repeated twice and then all three coats were given a 10 minute bake at 200° C. Smooth, tough, pinhole-free coatings 10–18 mils thick were obtained on the panels. Adhesion was roughly estimated by attempting to peel the coating from the metal surface after starting a cut with a pocket knife. The coatings could not be peeled from the metal.

*Example 2*

Some of the granules (50 grams) of Example 1 were placed in a one-quart pebble mill containing 770 grams of flint pebbles and ground therein for 2 and ¾ hours. Ninety-one percent of the resin passed through a 45 mesh screen (350 micron opening). Hence, the resin as ground was satisfactory for fluidized bed coating.

This example illustrates that grinding apparatus other than a hammer mill can be used to grind the resin granules into suitable particles. Micronizers and fluid energy mills have also been successfully employed and many other types of grinding apparatus can be used.

*Example 3*

The procedure of Example 1 was followed, but using 0.04 melt index polyethylene containing 50 p.p.m. of an antioxidant It is to be noted that a resin having a molecular weight such that its melt index is much below 0.04 and especially below about 0.005 melt index are dissolved in solvents only with difficulty and do not as a rule precipitate as well as less high molecular weight resins. The granules obtained were dry ground in a Mikro-Pulverizer using a 0.062 inch herringbone screen to produce powder of which 85% passed through a 35 mesh screen (500 micron opening). The resin gave satisfactory fluid bed coatings.

Other additives and modifiers than antioxidants, as here illustrated, can be used in the polyethylene prepared as powders with the method of the present invention.

*Example 4*

A heptane/resin slurry containing about 3% polyethylene in the form of ultimate particles was prepared as in Example 1. The slurry was filtered through a Büchner funnel to remove approximately ½ the heptane and allowed to air dry for 3 days to evaporate the remaining heptane. A hard, brittle product composed of polyethylene granules which was easily ground by one pass through a hammer mill using a 0.027 inch opening screen was obtained. Sieve analysis showed that:

Thirty-six percent of the product was retained on a 40 mesh (417 micron opening);

Forty-nine percent retained on 80 mesh (175 micron opening);

Fourteen percent passed through 80 mesh.

The portion remaining on the 40 mesh screen was reground and all passed through 40 mesh and most was retained on the 80 mesh screen. The particles on the 80 mesh screen (175–417 microns) were fluidized and applied to panels as in Example 1, using a 205° C. bake. Smooth, pinhole-free coatings were obtained.

*Example 5*

Polyethylene resin having a melt index of 3.65 was prepared as a powder as in Example 1. The granules were friable and easily ground in a hammer mill using 0.062 inch herringbone screen. The median particle size obtained was 300 microns in diameter with 70% of the resin passing through a 45 mesh screen (350 micron opening). This portion was used to coat steel panels as in Example 1 and satisfactory coatings were obtained.

The greatest usefulness of the powdered polyethylene produced in this process as is evident from the above description is in fludized bed coating of various articles. The powders can, of course, be employed in many other applications where a highly uniform powdered polyethylene product is required.

What is claimed is:

1. Method for preparing polyethylene powders which includes the steps of adding to a solution of a polyethylene having a melt index above about 0.005 in an inert liquid organic solvent a liquid nonsolvent for said polyethylene which is immiscible with said inert liquid organic solvent, agitating the solution and nonsolvent to form a dispersion comprising globules of said solution in the liquid nonsolvent, cooling the dispersion to precipitate said polyethylene from solution in the absence of turbulence in the form of ultimate particles suspended in said globules, separating the inert liquid organic solvent and said ultimate particles, thereby aggregating said ultimate particles into granules less than about 7,000 microns in average diameter, grinding the resulting friable granules until at least 95 percent by weight thereof have a particle size between about 50 and 500 microns.

2. Method for preparing polyethylene powders which includes the steps of adding water to a solution of a polyethylene having a melt index above about 0.005 in an inert liquid organic solvent, agitating the solution and water to form a dispersion comprising globules of said solution in water, cooling the dispersion to precipitate said polyethylene from solution in the absence of turbulence in the form of ultimate particles suspended in said globules, separating the inert liquid organic solvent and said ultimate particles, thereby aggregating said ultimate particles into granules less than about 7,000 microns in average diameter, dehydrating the resulting slurry and grinding the resulting friable granules until at least 95 percent by weight thereof have a particle size between about 50 and 500 microns.

3. Method for preparing polyethylene powders useful in fluidized bed coating which includes the steps of adding water to a solution of a polyethylene having a melt index between tbout 0.005 and 100 in an inert organic solvent, agitating the solution and water to form a dispersion comprising globules of said solution in the absence of turbulence in water, cooling the dispersion to precipitate said polyethylene from solution in the form of ultimate particles having an average diameter of less than 5 microns suspended in said globules, separating the inert liquid organic solvent and said ultimate particles, thereby aggregating said ultimate particles into granules between about 400 and 7,000 microns in average diameter, dehydrating the resulting slurry and grinding the resulting friable granules to a powder having an average diameter between about 50 and 500 microns.

4. The method claimed in claim 3 wherein the melt index of polyethylene is between 0.04 and 4.

5. The method claimed in claim 4 wherein the polyethlylene has a density above about 0.95.

6. Method for preparing friable granules of normally solid resinous ethylene polymers which includes the steps of adding to a dilute solution of an ethylene polymer having a melt index above about 0.005 in an inert liquid organic solvent a liquid nonsolvent for said polyethylene which is immiscible in said solvent, agitating the solution and nonsolvent to form a dispersion comprising globules of said solution in said nonsolvent, cooling the dispersion to precipitate the ethylene polymer from solution in the absence of turbulence in the form of ultimate particles having an average diameter of less than 5 microns suspended in said globules, separating the inert liquid organic solvent and aggregating said particles into granules between about 400 and about 7,000 microns in average diameter and separating the resulting friable granules.

7. Method for preparing friable granules of normally solid resinous polymers which includes the steps of adding water to a dilute solution of an ethylene polymer having a melt index above 0.005 in an inert liquid organic solvent, agitating the solution and water to form a dispersion comprising globules of said solution in water, cooling the dispersion to precipitate the ethylene polymer from solution in the absence of turbulence in the form of ultimate particles having an evarage diameter of less than 5 microns suspended in said globules, separating the inert liquid organic solvent and said ultimate particles, thereby aggregating said ultimate particles into granules between about 400 and about 7,000 microns in average diameter, dehydrating the resulting slurry and separating the resulting friable granules.

8. The method claim in claim 7 wherein the ethylene polymer has a density above about 0.95 and a melt index between 0.04 and 4.

References Cited in the file of this patent
UNITED STATES PATENTS

| | | |
|---|---|---|
| 2,858,902 | Cottle | Nov. 4, 1958 |
| 2,870,113 | Jones | Jan. 20, 1959 |
| 2,930,784 | Hanson et al. | Mar. 29, 1960 |
| 2,964,516 | Henderson | Dec. 13, 1960 |
| 2,969,347 | Bellinger et al. | Jan. 24, 1961 |
| 2,981,723 | Goins | Apr. 25, 1961 |